(12) United States Patent
Liang

(10) Patent No.: US 9,656,886 B2
(45) Date of Patent: May 23, 2017

(54) ELECTRICAL PURIFICATION APPARATUS AND METHODS OF MANUFACTURING SAME

(75) Inventor: Li-Shiang Liang, Harvard, MA (US)

(73) Assignee: Evoqua Water Technologies LLC

( * ) Notice: Subject to any disclaimer, the term of this patent is extended or adjusted under 35 U.S.C. 154(b) by 1194 days.

(21) Appl. No.: 13/365,300

(22) Filed: Feb. 3, 2012

(65) Prior Publication Data

US 2012/0199484 A1 Aug. 9, 2012

Related U.S. Application Data

(60) Provisional application No. 61/439,520, filed on Feb. 4, 2011.

(51) Int. Cl.
| | | |
|---|---|---|
| *C02F 1/469* | (2006.01) | |
| *B01D 61/46* | (2006.01) | |
| *B01D 63/08* | (2006.01) | |
| *C02F 1/44* | (2006.01) | |
| *C02F 103/04* | (2006.01) | |

(52) U.S. Cl.
CPC ............ *C02F 1/4695* (2013.01); *B01D 61/46* (2013.01); *B01D 63/082* (2013.01); *B01D 2313/08* (2013.01); *B01D 2313/10* (2013.01); *B01D 2313/12* (2013.01); *C02F 1/441* (2013.01); *C02F 2103/04* (2013.01)

(58) Field of Classification Search
CPC ........ B01D 61/46; B01D 61/48; B01D 63/02; B01D 2313/14; B01D 61/50; C02F 1/4693; C02F 1/4695
See application file for complete search history.

(56) References Cited

U.S. PATENT DOCUMENTS

| | | | | |
|---|---|---|---|---|
| 2,784,158 A | * | 3/1957 | Bodamer et al. ...... | B01D 61/50 204/635 |
| 4,303,493 A | * | 12/1981 | Kneifel et al. ................ | 204/636 |
| 5,681,438 A | * | 10/1997 | Proulx ......................... | 204/627 |
| 7,404,884 B2 | | 7/2008 | Montminy et al. | |
| 7,572,359 B2 | | 8/2009 | Liang et al. | |
| 2003/0089609 A1 | * | 5/2003 | Liang ..................... | B01D 61/44 204/627 |
| 2003/0192783 A1 | | 10/2003 | Liang et al. | |
| 2004/0188352 A1 | | 9/2004 | Dey et al. | |
| 2005/0016932 A1 | * | 1/2005 | Arba et al. ..................... | 210/748 |
| 2006/0016685 A1 | * | 1/2006 | Hawkins et al. ............ | 204/296 |
| 2006/0169581 A1 | | 8/2006 | Grebenyuk et al. | |

* cited by examiner

*Primary Examiner* — Steven A. Friday

(57) ABSTRACT

An electrical purification apparatus and methods of making same are disclosed. The electrical purification apparatus may provide for increases in operation efficiencies, for example, with respect to decreased residence times and higher purity water.

16 Claims, 13 Drawing Sheets

ELECTRICAL PURIFICATION APPARATUS AND METHODS OF MANUFACTURING SAME

CROSS-REFERENCE TO RELATED APPLICATIONS

This application claims priority under 35 U.S.C. §119(e) of U.S. Provisional Patent Application Ser. No. 61/439,520, filed on Feb. 4, 2011, titled "EDI DEVICES AND METHODS OF MANUFACTURING," the entire disclosure of which is hereby incorporated herein by reference in its entirety for all purposes.

FIELD OF THE DISCLOSURE

This disclosure relates to systems and methods of water treatment, and methods of making a system or apparatus for treating water. More particularly, this disclosure relates to systems and methods of water treatment using an electrical purification apparatus, and methods of making an electrical purification apparatus for treating water.

SUMMARY

In some embodiments of the present disclosure, an electrical purification apparatus is provided. The electrical purification apparatus may comprise a plurality of alternating ion depleting compartments and ion concentrating compartments defined by a plurality of ion exchange membranes. Each of the plurality of ion depleting compartments and ion concentrating compartments may comprise a spacer comprising a body and a cap. The cap may have a thickness of less than about 1 mm. The cap may comprise a first component that is mated with a second component on the body to provide a seal. The cap and the body may define a manifold. The spacer may be constructed and arranged to provide a product water resistivity of between about 10 megohm-cm to about 18 megohm-cm over a feed conductivity equivalent of about 5 μS/cm to about 100 μS/cm. The thickness of the spacer may be in a range of about 2 mm to about 4 mm. The spacer may be constructed and arranged to provide uniform fluid flow through each of the plurality of ion depleting or ion concentrating compartments. The spacer may comprise a first side having an uneven surface, and a second side having a flat surface. The electrical purification apparatus may further comprise a first modified spacer positioned at a first end of the electrical purification apparatus, and a second modified spacer positioned at a second end of the electrical purification apparatus. The apparatus may also comprise a first endblock positioned adjacent the first modified spacer, and a second endblock positioned adjacent the second modified spacer. The first endblock and the second endblock may have identical geometries.

The spacer may be constructed and arranged to provide a fluid flow velocity at a first point, a second point, and a third point within about 5 percent to about 10 percent of each other to provide the uniform fluid flow, the first point, the second point, and the third point running parallel to an edge of the spacer.

In some embodiments of the disclosure, an electrical purification apparatus is provided comprising a plurality of alternating ion depleting compartments and ion concentrating compartments defined by a plurality of ion exchange membranes. Each of the plurality of ion depleting compartments and ion concentrating compartments may comprise a spacer comprising a body and a cap. The cap may have a thickness of 1 mm and may comprise a first component that is mated with a second component on the body to provide a seal. The cap and the body may define a manifold to provide uniform fluid flow through each of the compartments. The manifold may provide channels to direct the fluid to the compartment and to provide a uniform fluid flow through the compartment. The cap may comprise ridges and grooves that provide for the channels in the manifold when mated with the body.

As discussed above, the spacer may comprise a first side having an uneven surface, and a second side having a flat surface. The electrical purification apparatus may further comprise a first modified spacer positioned at a first end of the electrical purification apparatus, and a second modified spacer positioned at a second end of the electrical purification apparatus. The apparatus may also comprise a first endblock positioned adjacent the first modified spacer, and a second endblock positioned adjacent the second modified spacer. The first endblock and the second endblock may have identical geometries.

In certain embodiments, the spacer may be constructed and arranged to provide a product water resistivity of between about 10 megohm-cm to about 18 megohm-cm over a feed conductivity equivalent of about 5 μS/cm to about 100 μS/cm. The thickness of the spacer may be in a range of about 2 mm to about 4 mm.

The spacer may be constructed and arranged to provide a fluid flow velocity at a first point, a second point, and a third point within about 5 percent to about 10 percent of each other to provide the uniform fluid flow, the first point, the second point, and the third point running parallel to an edge of the spacer.

In some embodiments of the disclosure, a system for providing ultrapure water is provided. The system may comprise a source of water comprising a total dissolved solids of about 50 ppm to about 1000 ppm. The system may also comprise a single-pass reverse osmosis unit fluidly connected to the source of water, and a single-pass electrodeionization device fluidly connected to the single-pass reverse osmosis unit comprising a plurality of concentrating compartments and diluting compartments. Each of the compartments may have a thickness of less than about 4 mm, and the device may be constructed and arranged to provide water comprising a total dissolved solids of about 5 ppb to about 100 ppb. The spacers may have the configurations and dimensions as discussed in the present disclosure.

In some embodiments of the disclosure, a method for providing ultrapure water is provided. Water comprising a conductivity equivalent of about 100 μS/cm to about 2000 μS/cm may be introduced to a single-pass reverse osmosis unit to produce a filtrate comprising a conductivity equivalent of about 5 μS/cm to about 100 μS/cm. The filtrate may be introduced into a single-pass electrodeionization device comprising a plurality of concentrating compartments and diluting compartments. Each of the compartments having a thickness of less than about 4 mm, to provide a product water comprising a resistivity of about 5 megohm-cm to 18 megohm-cm. The spacers may have the configurations and dimensions as discussed in the present disclosure.

BRIEF DESCRIPTION OF THE DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing.

In the drawings.

Figure 1A:
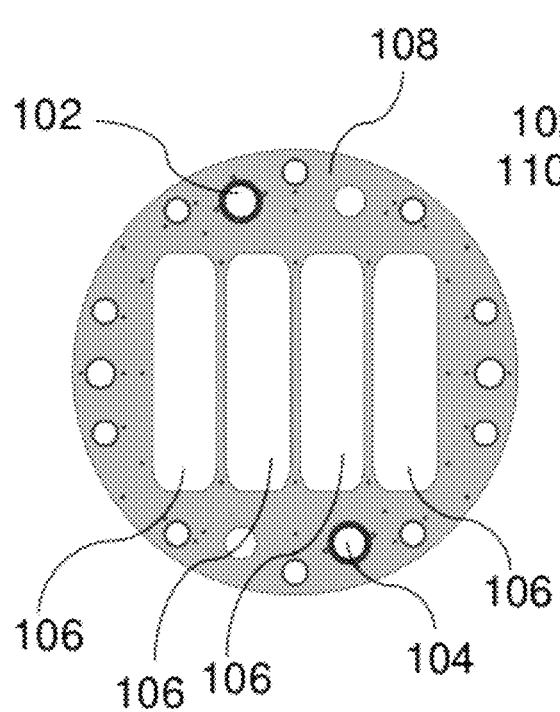
FIG. 1A is a schematic illustration of a spacer of an electrical purification apparatus in accordance with one or more embodiments of the disclosure.

At least some of the drawings may depict membranes, spacers, and cell stacks, in particular configurations and geometries. However, the disclosure is not limited to these particular configurations and geometries. With regard to the membrane cell stacks, any suitable geometry is acceptable so long as it allows for suitable operation of the electrical purification apparatus. For example the membranes or spacers may be rectangular in shape. The geometry of the membranes and spacers may be of any suitable geometry such that the membranes and spacers may be secured within a cell stack. In certain embodiments, a particular number of corners or vertices on the cell stack may be desired. For example, three or more corners or vertices may be desired to secure the cell stack to a housing. A housing may not be required in some embodiments. In certain embodiments, the geometry of any of the housing, cell stack, membranes, and spacers may be selected to accommodate operational parameters of the electrical purification apparatus. For example, the spacers may be asymmetrical to accommodate differences in flow rates between the dilute and concentrate streams.

DETAILED DESCRIPTION

Devices for purifying fluids using electrical fields are commonly used to treat water and other liquids containing dissolved ionic species. Two types of devices that treat water in this way are electrodeionization and electrodialysis devices.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance and potential for water splitting, which may result in scaling by compounds such as calcium carbonate ($CaCO_3$) and calcium sulfate ($CaSO_4$). Operation in such a regime is generally avoided. Also, because the operation of ED on high salinity feed waters can result in elevated electrical current consumption, ED apparatus have heretofore been most effectively used on source waters of intermediate salinity.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that may be isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations.

The present disclosure relates to devices that may purify fluids electrically that may be contained within a housing, as well as methods of manufacture and use thereof. Liquids or other fluids to be purified enter the purification device or apparatus and, under the influence of an electric field, are treated to produce an ion-depleted liquid. Species from the entering liquids are collected to produce an ion-concentrated liquid. The components of the electrical purification apparatus or device, which may also be referred to as an electrochemical separation system or an electrochemical separation device, may be assembled using various techniques to achieve optimal operation of the apparatus.

For the purposes of this disclosure, the term "feed water conductivity equivalent" (FCE) is used to provide a conductivity value to the feed water to be processed through the electrochemical purification apparatus. This term is used, at least in part, because weakly ionizable species such as carbon dioxide ($CO_2$), and silica ($SiO_2$) may become ionized in the electrochemical purification apparatus due to localized changes in pH due to water splitting. These ions must therefore be added to the ionic load to be moved through the membranes by the DC current. Typically, in order to calculate the FCE, the feed water conductivity (µS/cm) is measured. The concentration of carbon dioxide in parts per million (ppm) is also measured. In order to convert the concentration of carbon dioxide to conductivity, the concentration in ppm is multiplied by a factor of 2.79. The concentration of silica is also measured in ppm and then multiplied by a factor of 1.94. The measured conductivity is added to the carbon dioxide and silica calculated conductivity to determine the FCE.

In some embodiments of the present disclosure, an electrical purification apparatus is provided. The electrical purification apparatus may comprise a plurality of alternating ion depleting compartments and ion concentrating compartments defined by a plurality of ion exchange membranes. Each of the plurality of ion depleting compartments and ion concentrating compartments may comprise a spacer comprising a body and a cap. The compartment in each spacer may be further divided into sub-compartments or channels. These sub-compartments or channels may be fluidly in parallel. The cap may have a thickness of less than about 1 mm. The cap may comprise a first component that is mated with a second component on the body to provide a seal. The cap and the body may define a manifold. The spacer may be constructed and arranged to provide a product water resistivity of between about 10 megohm-cm to about 18 megohm-cm over a feed conductivity equivalent of about 5 µS/cm to about 100 µS/cm. The thickness of the spacer may be in a range of about 2 mm to about 4 mm. The spacer may be constructed and arranged to provide uniform fluid flow through the compartment or through each sub-compartment. The spacer may comprise a first side having an uneven surface, and a second side having a flat surface.

In order to accommodate the use of spacers comprising a first side having an uneven surface, and a second side having a flat surface in the electrical purification apparatus, the stack of spacers and membranes may comprise an additional spacer on one or both ends that comprises the same or similar surface characteristics or geometries on each side. The stack of spacers and membranes may also comprise an additional spacer on one or both ends that comprises a first surface characteristic or geometry on one side, and a second surface geometry on another side. These spacers which are located at one or both ends of the stack of spacer and membranes may be referred to as modified spacers. For example, an additional spacer with a flat surface on both sides, which may be referred to as a first modified spacer, may be positioned at the end of the stack with an uneven surface. An additional spacer with a flat surface on one side and an uneven surface on the other, which may be referred to as a second modified spacer, may be positioned at second end of the stack. This results in a flat surface facing outwards at both ends of the overall stack and eliminates or reduces the need to reconfigure or restructure each of the endblocks positioned at each end of the apparatus. Typically, endblocks have the similar or identical geometries and, therefore, may be interchangeably used at either end of the electrical purification apparatus. If the ends of a stack do not have the same or similar surface characteristics on each side, reconfiguration or restructuring of the endblocks may be necessary in order to seal the endblocks to the stack, and they would not be able to be used interchangeably at each end of the apparatus.

In some embodiments of the disclosure, an electrical purification apparatus is provided comprising a plurality of alternating ion depleting compartments and ion concentrating compartments defined by a plurality of ion exchange membranes. Each of the plurality of ion depleting compartments and ion concentrating compartments may comprise a spacer comprising a body and a cap. The cap may have a thickness of 1 mm and may comprise a first component that is mated with a second component on the body to provide a seal. The cap and the body may define a manifold to provide uniform fluid flow through the compartment defined by the spacer. The manifold may provide channels to direct the fluid to the compartment, and may also deliver fluid to the compartment to provide a uniform fluid flow through the compartments. The cap may comprise ridges and grooves that provide for the channels in the manifold when mated with the body.

As discussed above, the spacer may comprise a first side having an uneven surface, and a second side having a flat surface. The electrical purification apparatus may further comprise a first modified spacer positioned at one end of the stack and a second modified spacer positioned at a second end of the stack. The apparatus may also comprise a first endblock positioned adjacent the first modified spacer, and a second endblock positioned adjacent the other end of the stack. The first endblock and the second endblock may have identical geometries.

In certain embodiments, the spacer may be constructed and arranged to provide a product water resistivity of between about 10 megohm-cm to about 18 megohm-cm over a feed conductivity equivalent of about 5 µS/cm to about 100 µS/cm. The thickness of the spacer may be in a range of about 2 mm to about 4 mm.

In some embodiments of the disclosure, a system for providing ultrapure water is provided. The system may comprise a source of water comprising a total dissolved solids of about 50 ppm to about 1000 ppm. This water may be municipal water that may be or may not have been softened prior to introducing into the single-pass reverse osmosis unit. The system may also comprise a single-pass reverse osmosis unit fluidly connected to the source of water, and a single-pass electrodeionization device fluidly connected to the single-pass reverse osmosis unit comprising a plurality of concentrating compartments and diluting compartments. Each of the compartments may have a thickness of less than about 4 mm, and the device may be constructed and arranged to provide water comprising a total dissolved solids of about 5 ppb to about 100 ppb. The spacers may have the configurations and dimensions as discussed in the present disclosure. The single-pass reverse osmosis units and single-pass electrodeionization devices may refer to units and devices that are configured or arranged to allow for fluid to be processed through them in one pass from inlet to outlet, without recycling the fluid.

In some embodiments of the disclosure, a method for providing ultrapure water is provided. Water comprising a conductivity equivalent of about 100 µS/cm to about 2000 µS/cm may be introduced to a single-pass reverse osmosis unit. This water may be municipal water that may be or may not have been softened prior to introducing into the single-pass reverse osmosis unit. The single-pass reverse osmosis unit may produce a filtrate comprising a conductivity equivalent of about 5 µS/cm to about 100 µS/cm. The filtrate may be introduced into a single-pass electrodeionization device comprising a plurality of concentrating compartments and diluting compartments. Each of the compartments having a thickness of less than about 4 mm, to provide product water comprising a resistivity of about 5 megohm-cm to 18 megohm-cm.

In accordance with one or more embodiments, the efficiency of the electrical purification apparatus may be improved. Poor, uneven, or non-uniform flow of fluid through a compartment of the electrical purification apparatus may be one potential source of inefficiency. In some electrical purification apparatus designs, the flow may concentrate along the edges of the compartment, and along particular portions of the spacers. In some embodiments, such as those involving a spacer as presently disclosed, the potential for poor or uneven flow of fluid through a compartment of the electrical purification apparatus may be addressed. Flow through a compartment may be measured using a dye that may be added to feed water to be added to a spacer. Observation of the dyed fluid flow through the compartment may provide an indication of the uniformity of the flow through the compartment. In addition or in the alternative, velocity of the fluid at more than one point across the compartment, equi-distant, for example, from an entry point, may be measured to determine the uniformity of the flow of fluid through the compartment. In certain embodiments, a velocity of the fluid traveling through an ion diluting compartment, or an ion concentrating compartment, may be measured at various points along a line that runs parallel to an edge of the spacer that allow for entry of the fluid into the compartment. The velocity may be measured, for example, at a first point, a second point, and a third point along this parallel line. In specific embodiments, the points may be on a line that is perpendicular to the mean flow direction of fluid in the compartment or sub-compartment. For example, if the fluid is flow in a direction between an inlet and an outlet of the compartment, the points may be in a line that is perpendicular to the mean flow direction of the fluid between the inlet and the outlet.

In certain examples, the velocity at each of these points may be within about 5 percent to about 10 percent of each other. In certain embodiments, the velocity at each of these points may be within less than 5 percent of each other. In embodiments where the spacer comprises more than one channel or sub-compartment, the points, for example, the first point, the second point, and the third point, may be within the same channel or sub-compartment, in different channels or sub-compartments, or combinations therein.

One potential source of poor or uneven flow of fluid through a compartment of the electrical purification apparatus may involve the delivery of the fluid through a flow manifold that resides between a fluid inlet and the compartment.

In one or more embodiments, the flow of fluid through a flow manifold may be manipulated to promote consistent, even fluid flow through the manifold, which may deliver the fluid through the compartment in the same consistent, even manner. This may improve the efficiency of the electrical purification apparatus, which may be observed in the quality of the product water that is produced from the electrical purification apparatus. This may also be observed in the shorter residence times achieved, while maintaining the high level of product water quality. In certain embodiments, the increased efficiency of the electrical purification apparatus may also be observed by way of achieving a high level of product water quality over a wide range of feed conductivities or feed conductivity equivalents.

Leakage of fluid from the compartments of the electrical purification apparatus may be another potential source of inefficiency. In some electrical purification apparatus designs, liquid being processed through the apparatus and that is being passed through the compartments may leak out of the compartments due to inferior sealing of, for example, the membranes and spacers to one another. This fluid loss will reduce the overall feed fluid that may be processed to produce product water and, thus, reduce the overall efficiency of the electrical purification apparatus.

Leakage of fluid between the compartments of the electrical purification apparatus, which may be referred to as cross-leakage, may be another potential source of inefficiency. For example, leakage from the ion concentrating compartments to the ion depleting compartments may result in contamination of the product and lead to inefficiencies.

In one or more embodiments, the seals of the membranes and spacers to provide a cell stack may be adjusted or altered to prevent or reduce leakage of fluid from a compartment or between compartments. This may result in more efficient operation of the apparatus, which may be observed in the shorter residence times achieved, while maintaining a high level of product water quality. In certain embodiments, the increased efficiency of the electrical purification apparatus may also be observed by way of achieving a high level of product water quality over a wide range of feed conductivities or feed conductivity equivalents.

The prevention or reduction of leakage may be manifested through the modification or adjustment to the construction in the configuration of the spacer. In conventional electrical purification apparatus, spacers and membranes may be mated to one another by way of adhesives or thermal bonding. In some embodiments of this disclosure, spacers and membranes may be mated to one another by way of seals that may be molded or over-molded onto the spacer. The molded or over-molded spacers may provide seals that prevent or reduce leakage of fluid from a compartment.

The spacer may be constructed and arranged to provide an electrical purification apparatus comprising inter-membrane spacing in a range of about 2 mm to about 4 mm. In certain embodiments, the spacers may be constructed and arranged to provide an electrical purification apparatus comprising inter-membrane spacing in a range of about 2 mm to about 10 mm. The spacers in a cell pair may be mirror images of one another except for the thickness of the caps and the spacer bodies. In certain embodiments, the dilute spacer may be thicker and the concentrate spacer may be thinner. Alternatively, the dilute spacer may be thinner and the concentrate spacer may be thicker.

The shape of the spacers of the present disclosure may be any shape suitable to perform their intended function in the electrochemical apparatus. In some embodiments, the spacer may be square, rectangular or polygonal in shape. In some embodiments, the spacer may be non-uniform or non-symmetric in shape.

In certain embodiments of this disclosure, each spacer may have a periphery that is circular or approximately circular in shape. A stack of spacers and membranes, along with electrodes, endblocks and endplates, and optionally, tie-bars may be inserted and sealed into a cylindrical vessel. The vessel may provide mechanical support to counter the internal pressure in the cell stack. The pressure may be calculated by taking the sum of the fluid pressure and potential pressure from expansion of ion exchange resins in operation. The vessel may also assist in containing potential leakage of fluid from the cell stack. In certain embodiments, a vessel may not be necessary, such as when the spacers are molded of materials with sufficient rigidity such that they may withstand the internal pressures without assistance of a vessel.

The selection of material for the spacer may depend on the ability for it to be molded with thin walls and small dimensions, for example, on the order of about 0.060 inches (1.5 mm) or less. The material may also have the ability to be molded with small holes, preferably on the order of about 0.030 inches (0.75 mm) or less. The material may have a suitable elasticity to allow appropriate interlocking of the male and female features, and may have chemical compatibility with the fluid to be purified, while maintaining some rigidity to withstand pressures encountered during operation of the apparatus.

In certain embodiments of the disclosure, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment, which will be discussed further below. In certain embodiments, the obstructions, projections, protrusions flanges, or baffles may be referred to as a flow redistributor.

Sealing may be accomplished by any suitable means for ensuring mating between the membranes so as to provide the desired fluid flow path through compartments defined by the membranes. For example, sealing may be accomplished by adhesives, thermal bonding by laser or ultrasonic welding, for example, or by mating or interlocking, for example, using male and female features on adjacent membranes and/or spacers.

Figure 1B:
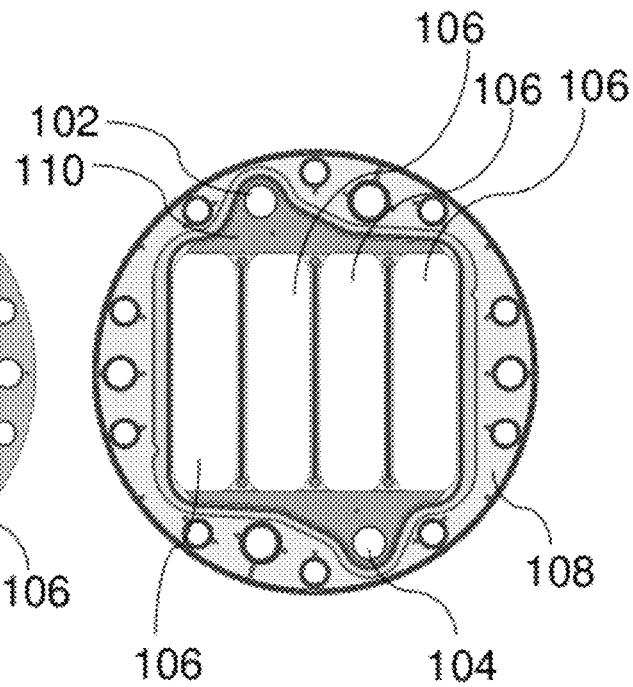
FIG. 1B is a schematic illustration of a spacer of an electrical purification apparatus in accordance with one or more embodiments of the disclosure.

FIG. 1 shows an example of a spacer of the present disclosure. A first side of the spacer may be flat, as shown in FIG. 1A while a second side of the spacer may comprise ridges or grooves to provide seals, as shown in FIG. 1B. As shown in FIGS. 1A and 1B, inlet 104 allows fluid to enter flow compartments 106 defined by a first membrane adjacent a first side of the spacer, and a second membrane adjacent a second side of the spacer. The fluid flows through flow compartments 106 and exits compartments 106 by way of outlet 102. The spacer may provide a body 108 and cap 110, which may mate with a portion of body 108 to provide a flow manifold defined by body 108 and cap 110.

The ridges or grooves may be provided on second side of the spacer (FIG. 1B) to provide one or more seals to create one or more compartments in an electrical purification apparatus. In certain embodiments, by provided the ridges and grooves on one side of the spacer, and allowing the second side to be flat, or essentially flat, a spacer in a range of about 2 mm to about 4 mm may be constructed. In certain other embodiments, a spacer of less than about 2 mm may be constructed.

The spacers may be constructed of a polymer material and may be injection molded or produced by any known method of fabrication. The seals may be constructed of an elastomeric material and may be over-molded onto the polymeric material of the spacer. In other embodiments, the spacers may be machined from a polymeric material and may comprise grooves a one side to have the capability of mating with o-rings.

Figure 2:
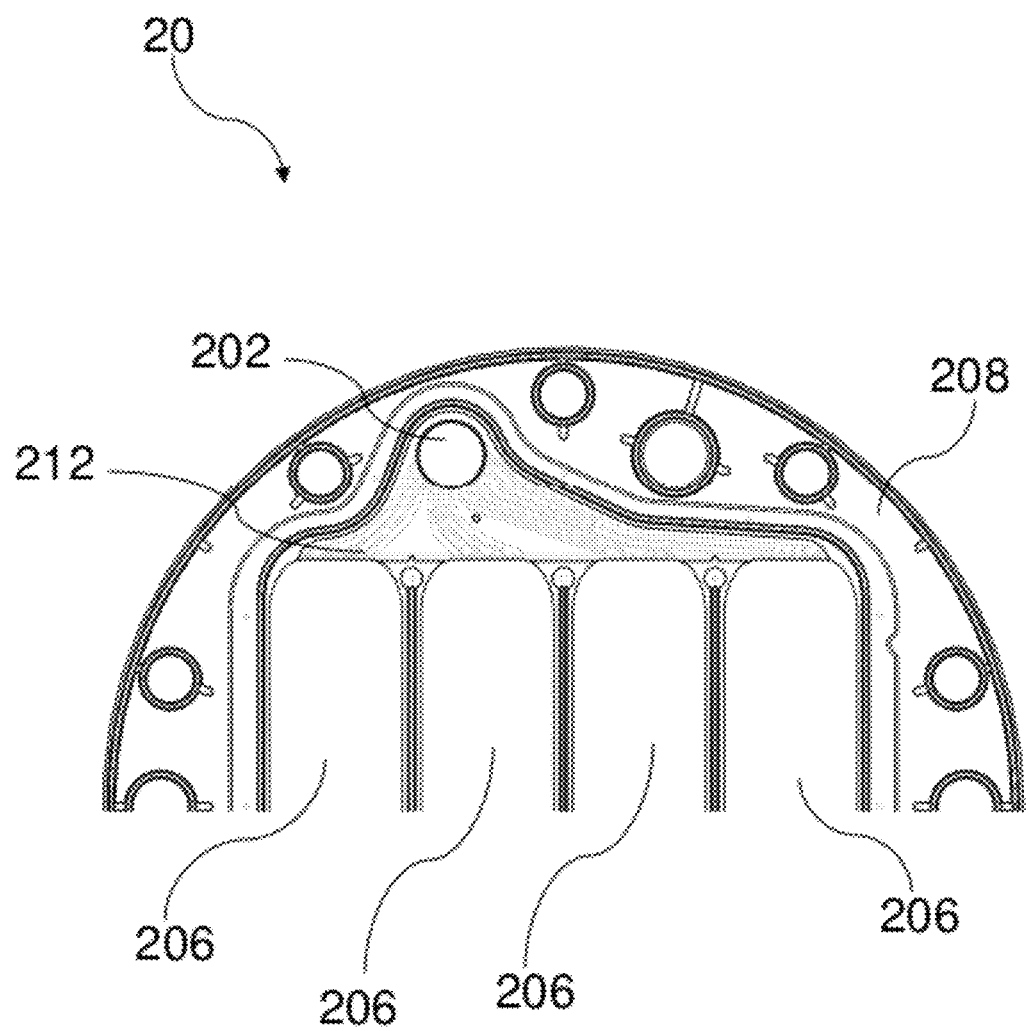
FIG. 2 is a schematic illustration of a portion of a spacer of an electrical purification apparatus in accordance with one or more embodiments of the disclosure.

The spacers of the present disclosure may comprise a flow manifold that may allow for flow of fluid between an inlet and the flow compartment, and the flow compartment and an outlet. As shown in FIG. 2, a portion of spacer 20 is illustrated comprising inlet 202 and flow compartments 206. Flow manifold 212 may be defined by a portion of body 208 and a cap (not shown). The cap or the body may comprise ridges or grooves that may direct fluid flow through the manifold to the flow compartments. As shown in FIG. 2, hidden lines are depicted to show these ridges or grooves.

Figure 3:
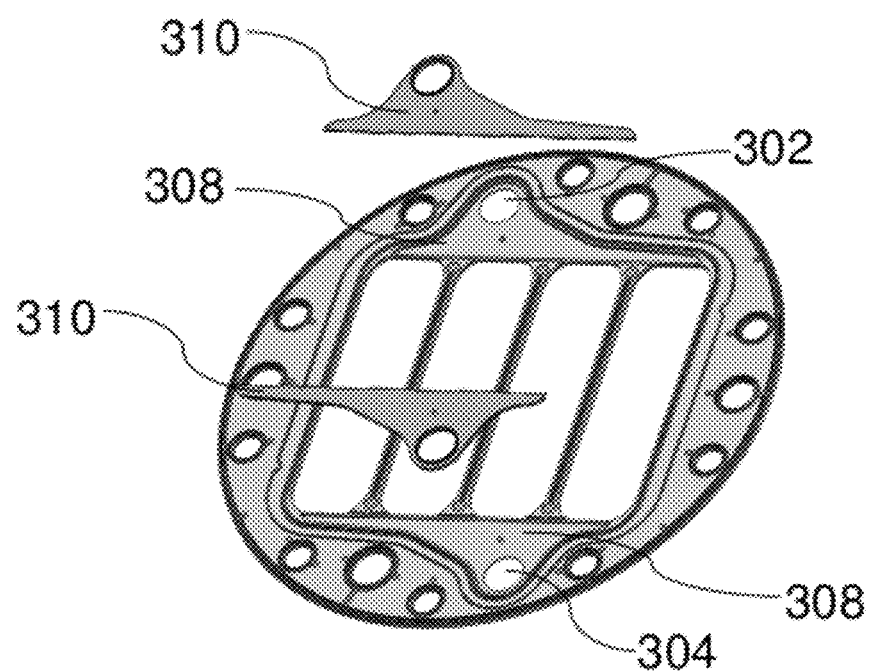
FIG. 3 is a schematic illustration of a spacer of an electrical purification apparatus in accordance with one or more embodiments of the disclosure.

FIG. 3 shows one embodiment of the cap with features, such as ridges and grooves that may direct fluid flow through the manifold. Cap 310 may be mated with a portion of body 308 to define a flow manifold adjacent inlet 302 and outlet 304. The ridges and grooves that may direct fluid flow through the manifold may be provided in the cap, the body, or both. In certain embodiments, in which the cap comprises the ridges and grooves, the cap may be constructed of a thickness of about 1 mm or less. This is in part due to the ridges providing structural integrity to the cap, and reducing distortion of the piece as it cools, which allows this piece to be molded to such a thickness. By providing a cap that has a thickness of about 1 mm or less, the total thickness of the spacer may be in a range of about 2 mm to about 4 mm. In certain embodiments, the spacers may be constructed and arranged to provide an electrical purification apparatus comprising inter-membrane spacing in a range of about 2 mm to about 10 mm.

Figure 4:
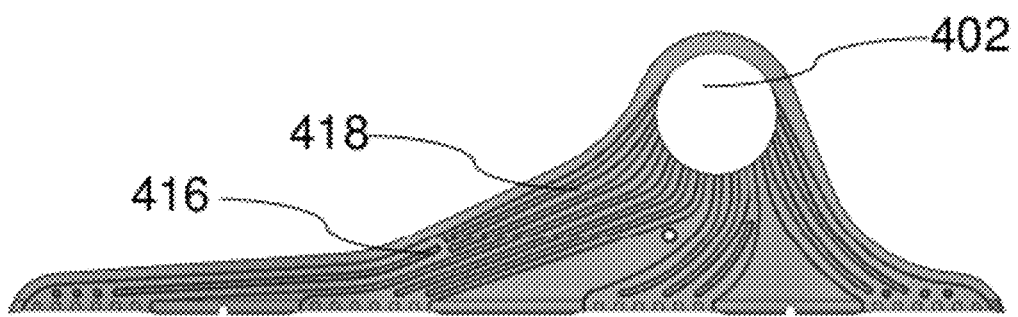
FIG. 4 is a schematic illustration of a portion of a spacer of an electrical purification apparatus in accordance with one or more embodiments of the disclosure.

In one embodiment of the disclosure, a cap is constructed as shown in FIG. 4. Cap 40 may comprise inlet 402. Ridges 416 and grooves 418 may be provided that may direct flow of fluid through a manifold.

Figure 5A:
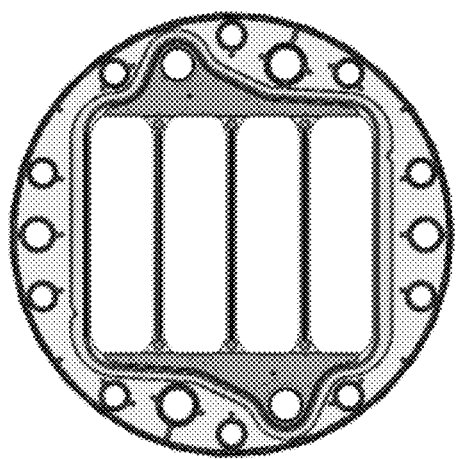
FIG. 5A is a schematic illustration of a spacer of an electrodeionization apparatus in accordance with one or more embodiments of the disclosure.
Figure 5B:
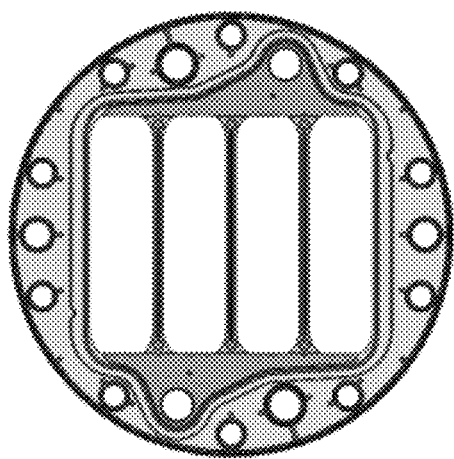
FIG. 5B is a schematic illustration of a spacer of an electrodeionization apparatus in accordance with one or more embodiments of the disclosure.

FIGS. 5A and 5B illustrate a first spacer and a second spacer. The spacers may be the same thickness, and are mirror images of one another. In certain embodiments, the spacer of FIG. 5A may be a spacer for a dilute compartment, and the spacer of FIG. 5B may be a spacer for a concentrate compartment.

Figure 6:
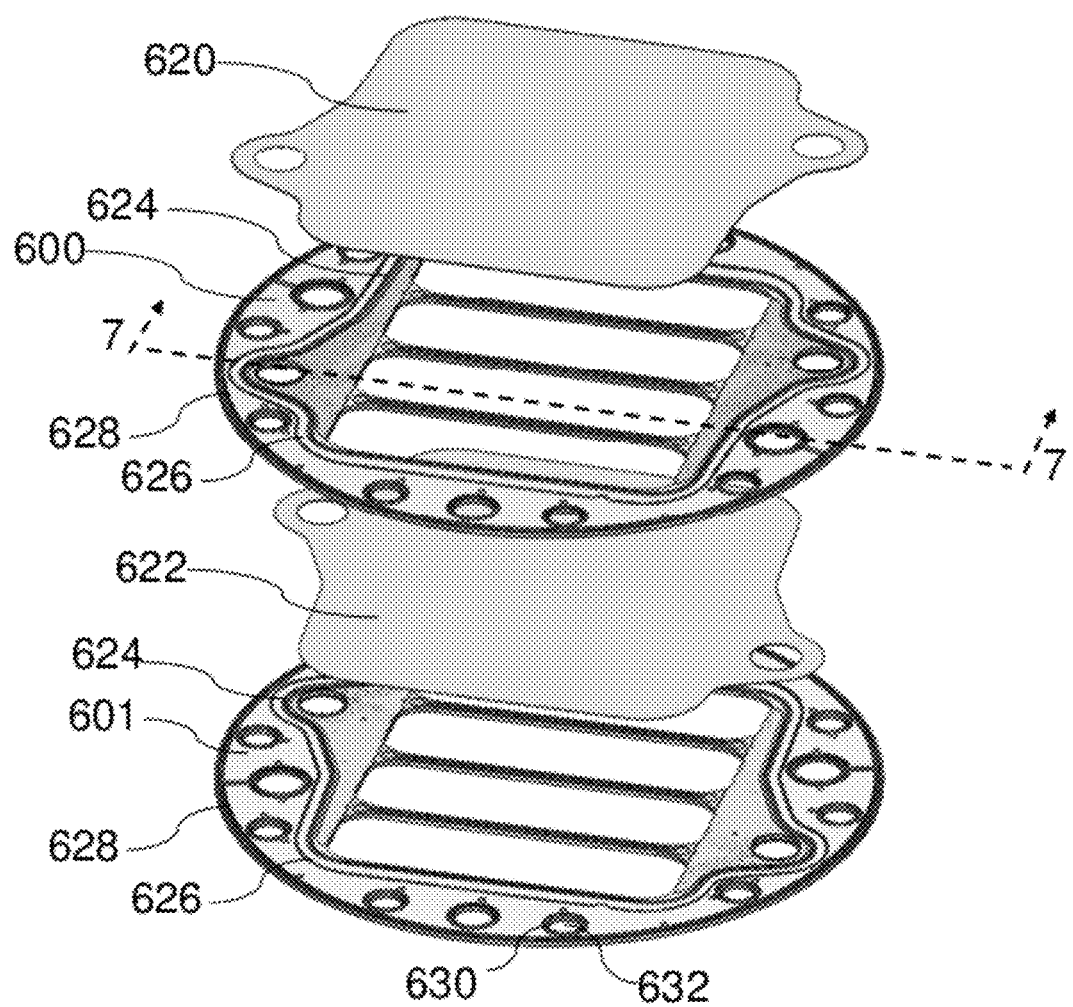
FIG. 6 is an exploded view schematic illustration of a cell pair of an electrodeionization apparatus in accordance with one or more embodiments of the disclosure.

FIG. 6 illustrates an exploded view of a cell pair of an electrical purification apparatus. The cell pair comprises first ion exchange membrane 620 and second ion exchange membrane 622. In certain embodiments, first ion exchange membrane 620 may be an anion exchange membrane and second ion exchange membrane 622 may be a cation exchange membrane. First spacer 600 is positioned between first ion exchange membrane 620 and second ion exchange membrane 622. Second spacer 601 may be positioned between second ion exchange membrane 622 and another ion exchange membrane (not shown). In certain embodiments, first spacer 600 may be a spacer for a dilute compartment, and second spacer may be a spacer for a concentrating compartment.

Several seals are illustrated on the spacers of FIG. 6. Seal 624 may be provided on each of spacer 600 and 601 to seal each spacer to the adjacent membrane. For example, seal 624 on spacer 600 serves to seal spacer 600 to membrane 620. Seal 624 on spacer 601 serves to seal spacer 601 to membrane 622.

An intermediate seal, seal 626 may provide a back-up seal to seal 624, and seals each spacer to the adjacent spacer. For example, seal 626 on spacer 601 serves to seal spacer 601 to spacer 600. Peripheral seal 628 provides a further back-up seal to seal 624 and seal 626, and also seals each spacer to the adjacent spacer. For example, seal 628 on spacer 601 serves to seal spacer 601 to spacer 600.

Seals are also provided around tie-bar apertures, such as seal 630 positioned around tie-bar aperture 632 on spacer 601.

Figure 7:
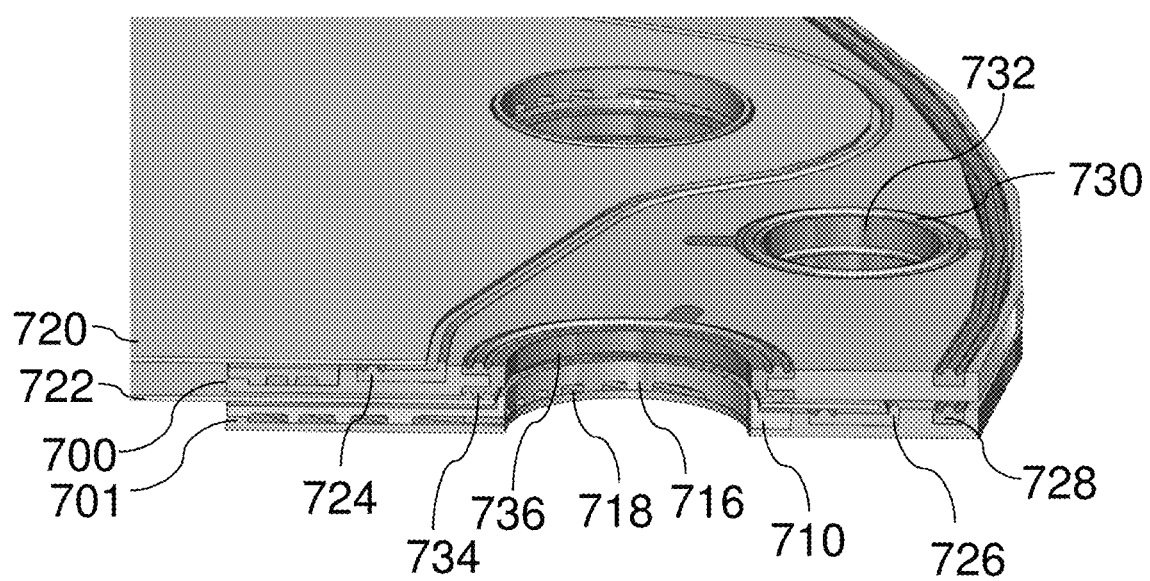
FIG. 7 is a section view schematic illustration through 7-7 of the cell pair of FIG. 6 in accordance with one or more embodiments of the disclosure.

FIG. 7 is a section view through the cell pair of FIG. 6. The cell pair comprises first ion exchange membrane 720 and second ion exchange membrane 722. In certain embodiments, first ion exchange membrane 720 may be an anion exchange membrane and second ion exchange membrane 722 may be a cation exchange membrane. First spacer 700 is positioned between first ion exchange membrane 720 and second ion exchange membrane 722. Second spacer 701 may be positioned between second ion exchange membrane 722 and another ion exchange membrane (not shown). In certain embodiments, first spacer 700 may be a spacer for a dilute compartment, and second spacer 701 may be a spacer for a concentrating compartment. Cap 710 is shown associated with spacer 701. Cap 710 comprises ridges 716 and grooves 718 that may direct flow of fluid through a manifold.

Several seals are illustrated on the spacers of FIG. 7. Seal 724 may be provided on each of spacer 700 and 701 to seal each spacer to the adjacent membrane. For example, seal 724 on spacer 700 serves to seal spacer 700 to membrane 720.

An intermediate seal, seal 726 may provide a back-up seal to seal 724, and seals each spacer to the adjacent spacer. For example, seal 726 on spacer 701 serves to seal spacer 701 to spacer 700. Peripheral seal 728 provides a further back-up seal to seal 724 and seal 726, and also seals each spacer to the adjacent spacer. For example, seal 728 on spacer 701 serves to seal spacer 701 to spacer 700.

Seals are also provided around tie-bar apertures, such as seal 730 positioned around tie-bar aperture 732 on spacer 700. Another seal, seal 734, located around aperture 736 of spacer 700 may prevent cross-leakage at aperture 736 between the flow compartments of spacer 700 and spacer 701.

Example 1

Testing was performed on various electrochemical purification devices, including a continuous electrodeionization device according to some embodiments of the present disclosure (Module A), to compare performance and product water quality to other electrochemical purification devices (Modules B and C).

The number of cell pairs in Module A was 10. The inter-membrane distance was 0.125 inches (3.2 mm). The nominal flow rate per dilute cell was 0.169 gpm (638 mL/min). The residence time in the dilute cell was 16.7 seconds. The nominal flow rate per concentrate cell: 0.0146 gpm (55 mL/min). The overall recovery of product flow rate per total feed flow rate was 90 percent. The feed to each Module A was the product from a reverse osmosis system, fed with municipal water, with further addition of sodium chloride (NaCl) and carbon dioxide ($CO_2$) gas to adjust the feed conductivity equivalent (FCE). The feed temperature averaged at about 22° C.

Module B had an inter-membrane distance of 0.095 inches (2.4 mm). The residence time in the dilute cells at nominal flow rate was 24 seconds. The residence time in the dilute cells at maximum flow rate was 18 seconds.

Module C had an inter-membrane distance of 0.36 inches (9.1 mm). The residence time in the dilute cells at nominal flow rate was 14.9 seconds.

Figure 8:
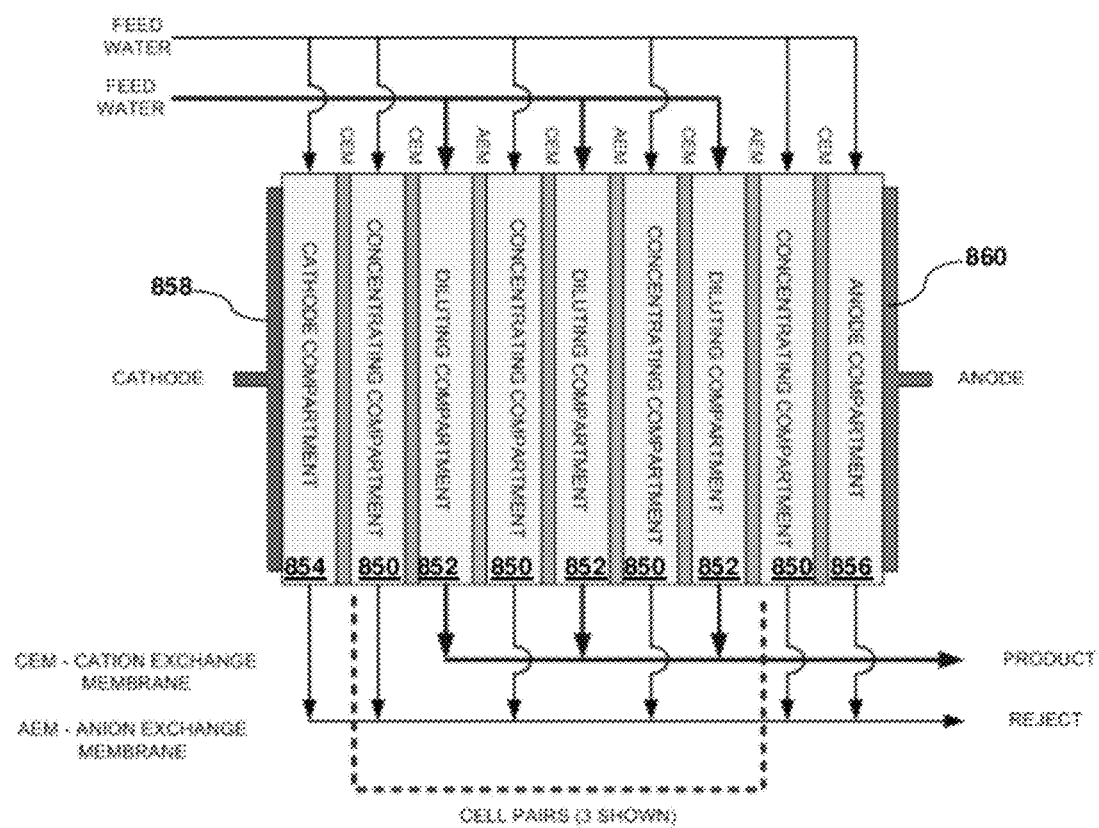
FIG. 8 is an illustration of a portion of an electrical purification apparatus in accordance with one or more embodiments of the disclosure.
Figure 9:
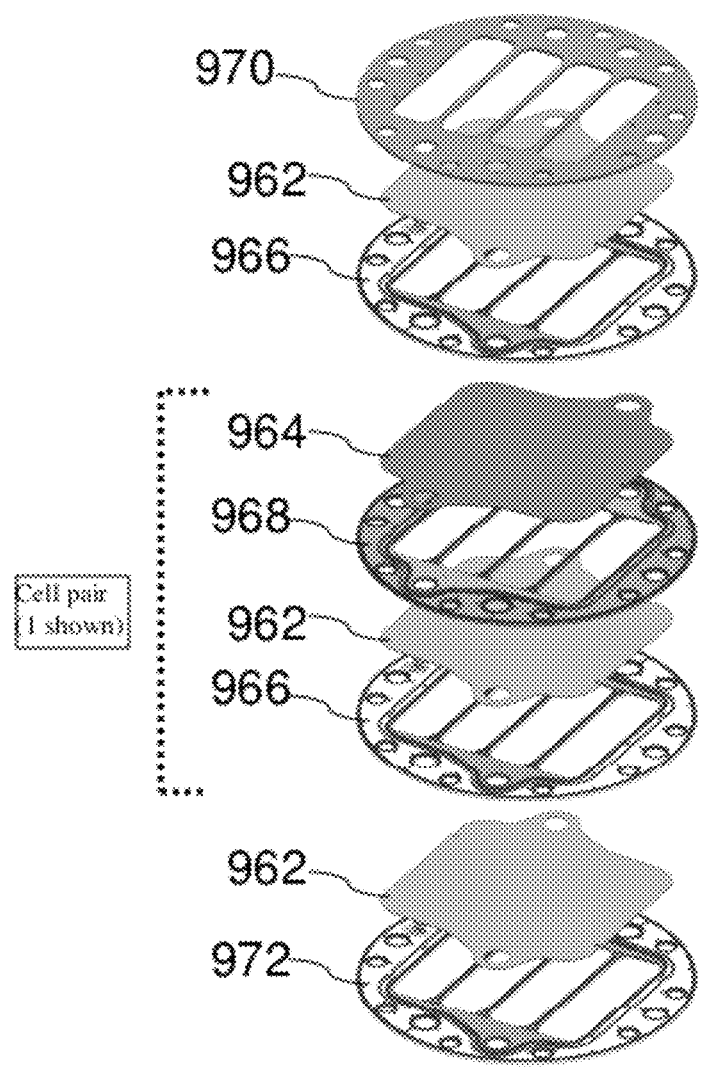
FIG. 9 is an exploded view schematic illustration of a portion of an electrical purification apparatus in accordance with one or more embodiments of the disclosure.

The details of Module A are shown in FIGS. 8 and 9. FIG. 8 is a schematic of an arrangement of the compartments and membranes in an electrical purification apparatus, such as that of Module A. In FIG. 8, 3 cell pairs are shown for simplicity; however, Module A contained 10 cell pairs. The electrical purification apparatus of FIG. 8 shows alternating concentration compartments 850 and diluting compartments 852. An electrode compartment, such as cathode compartment 854 and anode compartment 856 reside adjacent a concentrating compartment 850 at each end of the apparatus. Cathode 858 resides adjacent cathode compartment 854 and anode 860 resides adjacent anode compartment 856. Cathode compartment 854, anode compartment 856, and concentration compartments 850 are all fluidly in parallel. All diluting compartments 852 are also all fluidly in parallel. Concentrating compartments 850 may also be referred to as buffer compartments and may additionally be used to isolate anode compartment 856 or cathode compartment 854 from diluting compartments 852 so that products of electrode reactions do not contaminate the product.

FIG. 9 shows an exploded view of a stack of spacers and membranes, as shown in FIG. 8. Only one cell pair, however, is shown for clarity. Cation exchange membranes 962 and anion exchange membrane 964 are interspersed between spacers 970, 966, 968, and 972. Spacers 966 comprises concentrating compartments and spacer 968 comprises a diluting compartment. Each of spacers 966 and 968 comprise geometries and characteristics as discussed above with regarding to FIGS. 1A and 1B. Spacer 970, which may be referred to as a first modified spacer, comprises the anode compartment, and has a first flat side and a second flat side so as to conform both to the anode and cation exchange membrane 962 and spacer 966. Spacer 972, which may be referred to as a second modified spacer, comprises the cathode compartment, and has a first side comprising seals and a second side (not shown) that is flat so as to confirm both to the cathode and cation exchange membrane 962 and spacer 966. The second side of spacer 972 may not comprise a seal, such as that shown in FIG. 7, seal 734. This may allow for better alignment with the cathode.

Figure 10:
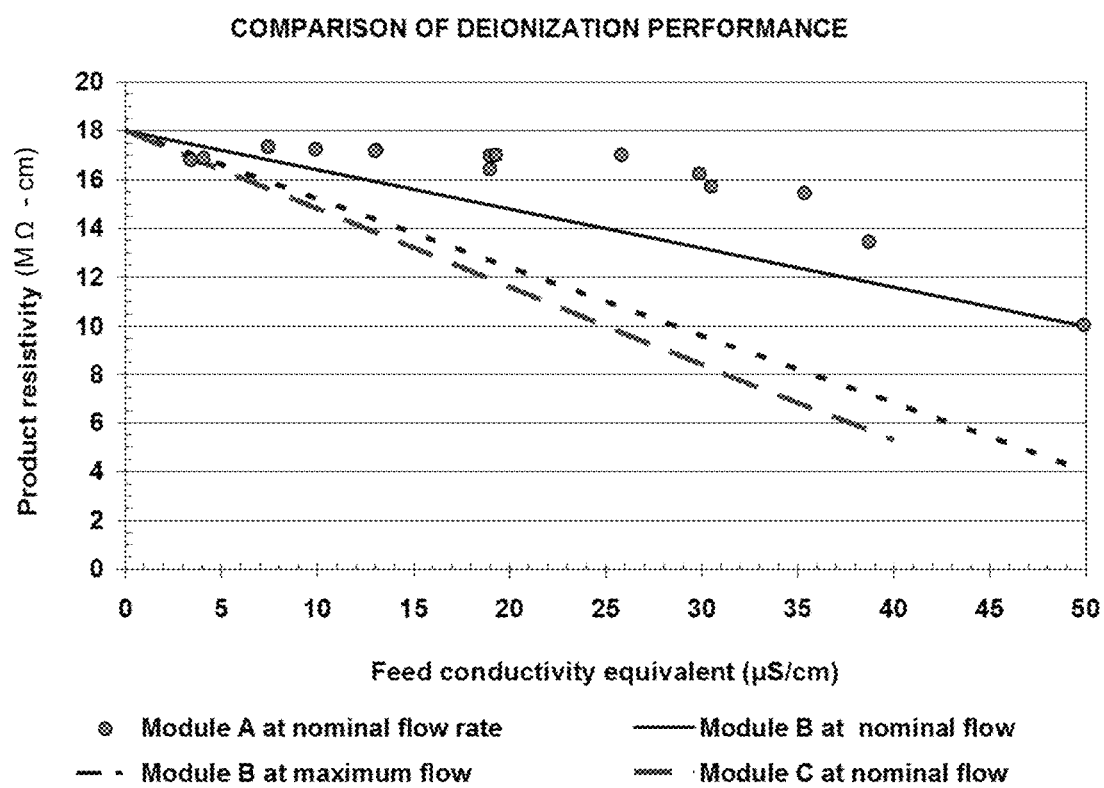
FIG. 10 is a graph of water quality versus feed conductivity equivalent in accordance with one or more embodiments of the disclosure.

As shown in FIG. 10, a plot of water quality versus feed conductivity equivalent is shown. The various lines and plotted points on the graph refer to the different electrochemical devices run at particular conditions. Feed waters were tested that varied in feed conductivity equivalent values in a range of about 1 µS/cm to about 50 µS/cm. For Module A, feed waters were tested that comprised a feed conductivity equivalent of from about 4 µS/cm to about 50 µS/cm. As shown from the graph, the quality of the water (resistivity) was maintained in a range of about 15 megohm-cm to about 17 megohm-cm over a feed conductivity equivalent of about 5 µS/cm to about 35 µS/cm. The quality of the water (resistivity) was maintained in a range of about 10 megohm-cm to about 18 megohm-cm over a feed conductivity equivalent of about 5 µS/cm to about 50 µS/cm. The residence time in the electrical purification apparatus was 16.7 seconds.

Module B operating at a nominal flow did not provide consistent water quality over the same feed conductivity equivalent range, despite it having a longer residence time of 24 seconds. Module B, operated at maximum flow, and Module C, operated at nominal flow, also did not provide consistent water quality over the same feed conductivity equivalent range. This data shows the improved product water quality that can be achieved over a wide range of feed conductivity equivalents by using the electrochemical purification apparatus of some embodiments of the present disclosure.

Not only was product water quality improved using the electrochemical purification apparatus of the present disclosure, but residence time of water flowing through the apparatus was reduced from 24 seconds to 16.7 seconds. This demonstrates that the electrochemical purification apparatus of the present disclosure is operating more efficiently with better product water quality than other devices. As shown, when an attempt was made to match the decreased residence time in Module B to 18 seconds, the product water quality was substantially lower for most given feed conductivity equivalents.

As evidenced from the results discussed above, the electrical purification apparatus of the present disclosure provides higher product water quality over a diverse feed water, and also provides for faster processing of the water. This apparatus may provide more efficient processing of water and reduce operating costs. This apparatus also allows for a wide range of feed waters to be used to effectively achieve a high product water quality.

Example 2

Figure 11:
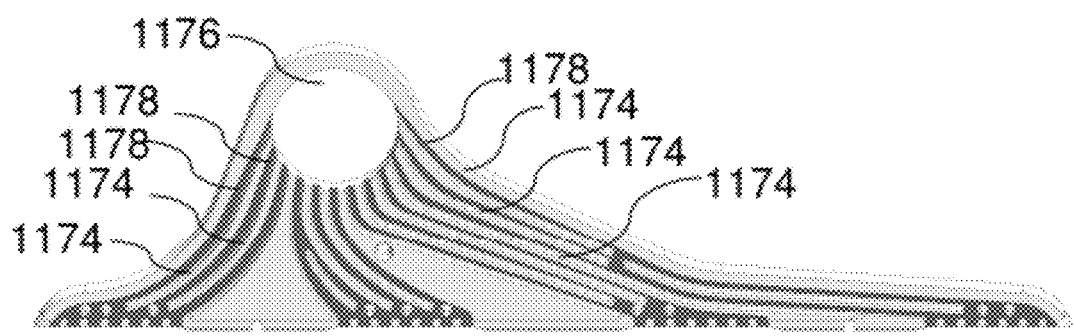
FIG. 11 is a schematic illustration of a spacer of an electrical purification apparatus in accordance with one or more embodiments of the disclosure.

One embodiment of the cap is illustrated in FIG. 11. The cap of FIG. 11 was used to perform computational fluid dynamics (CFD) simulations to illustrate the uniform flow rate of fluid going through the spacer. As shown in FIG. 11, ribs, exemplarily shown at 1174, are molded as part of the cap over the flow manifolds to direct the flow from inlet 1176 and outlet ports to the sub-compartments or channels of a spacer. The sub-compartments or channels may be resin filled. Flow passages, exemplarily shown at 1178, connect inlet 1176 to channels of the spacer. In this figure, the passages are in four independent groups.

In certain embodiments, it is desired to have equal flow rates in each channel, assuming that the channels have the same volume. The residence time per channel is then equal, and entire resin volume in the spacer and the contiguous membrane areas are fully utilized to transport of ions from the dilute to the concentrate compartments.

From flow simulation and laboratory tests, it has been found that the design in FIG. 11 is able achieve uniform flow distribution. The flow from the inlet port through each channel to the outlet port can essentially be independently adjusted by varying the dimensions and locations of the ribs in the caps. A certain amount of interactions between the flows through the channels may be unavoidable but may be accounted for in the design.

Figure 12:
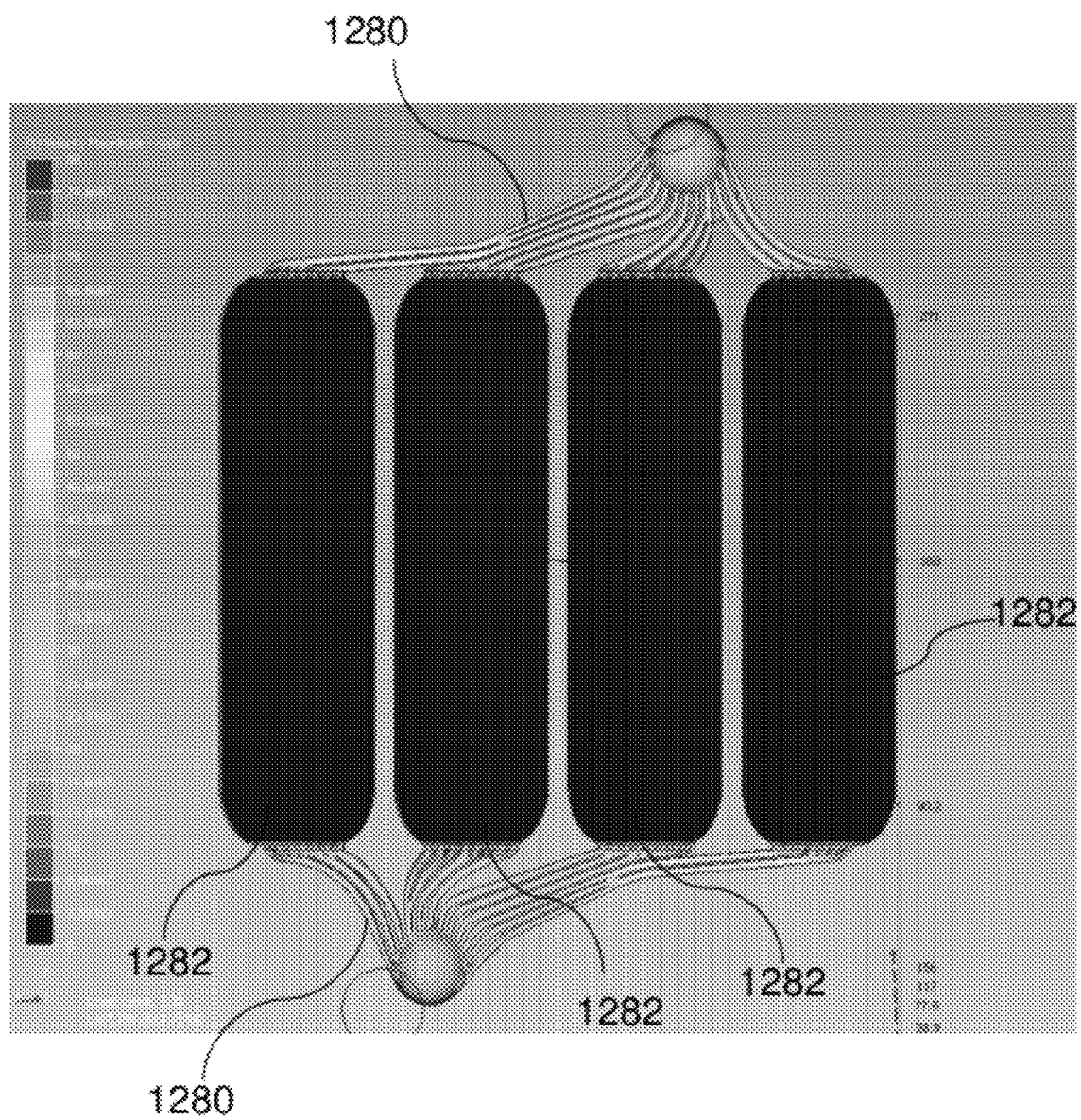
FIG. 12 is a computational fluid dynamics simulation in accordance with one or more embodiments of the disclosure.

FIG. 12 shows the results of a CFD simulation of a spacer such as that shown in FIG. 11. Flow passages, such as that exemplarily shown as 1280, connect the inlet and outlet ports to channels 1282. The flow velocities in passages 1280 vary; however, variations in flow velocity in the resin channels are unnoticeable. If points are selected that are on a line that is perpendicular to the mean flow direction of fluid in the compartment or sub-compartment, the velocity of these points will be within about 5 percent to about 10 percent of each other to provide the uniform fluid flow. In some instances, the velocity at these points may be within at least 5 percent of one another.

Figure 13:
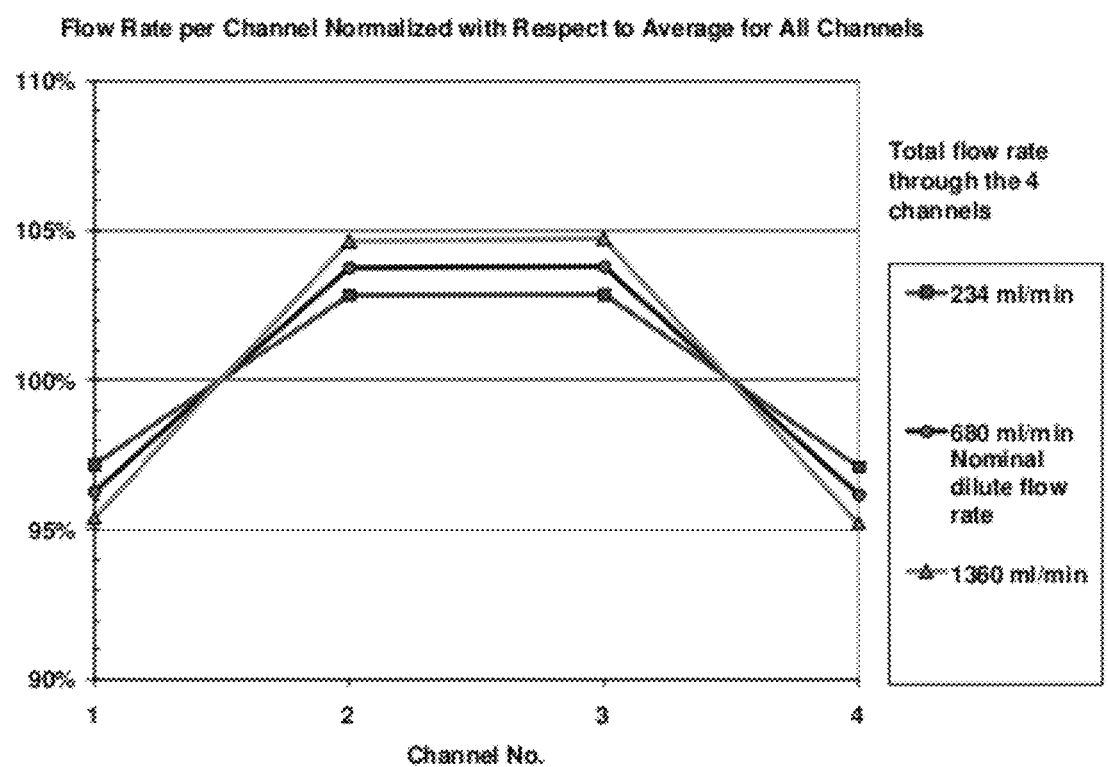
FIG. 13 is a graph of flow rate versus channel number for an example in accordance with one or more embodiments of the disclosure.

FIG. 13 shows the distribution of flow rate through the four channels of the spacer depicted in FIG. 12. The variation in flow rates with respect to the average is less than 5 percent, even with total flow rate varying from about 50 percent to 150 percent of the nominal (between 234 ml/min and 1360 ml/min.)

These results demonstrate the effectiveness of the design of the electrical purification apparatus, according to certain embodiments of this disclosure, in provide uniform fluid flow through each of the compartments. By have a more uniform fluid flow, residence times of fluid in the compartment may be reduced, leading to more feed water being processed over time, and utilizing less energy to process the water. These results demonstrate a more efficient, effective, and less costly process for treating water.

While exemplary embodiments of the disclosure have been disclosed many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the electrical purification apparatus and methods of the present disclosure are used. Those skilled in the art will recognize, or be able to ascertain using no more than routine experimentation, many equivalents to the specific embodiments described herein. For example, those skilled in the art may recognize that the apparatus, and components thereof, according to the present disclosure may further comprise a network of systems or be a component of a water purification or treatment system. It is, therefore, to be understood that the foregoing embodiments are presented by way of example only and that, within the scope of the appended claims and equivalents thereto, the disclosed electrical purification apparatus and methods may be practiced otherwise than as specifically described. The present apparatus and methods are directed to each individual feature or method described herein. In addition, any combination of two or more such features, apparatus or methods, if such features, apparatus or methods are not mutually inconsistent, is included within the scope of the present disclosure.

For example, the housing may be of any suitable geometry such that one or more membrane cell stacks or modular units may be secured within. For example, the housing may be cylindrical, polygonal, square, or rectangular. With regard to the membrane cell stacks, any suitable geometry is acceptable so long as the cell stack may be secured to the housing. For example the membranes or spacers may be rectangular in shape. In certain embodiments, a housing may not be required. The geometry of the membranes and spacers may be of any suitable geometry such that the membranes and spacers may be secured within a cell stack. In certain embodiments, a particular number of corners or vertices on the cell stack may be desired. For example, three or more corners or vertices may be desired to secure the cell stack to the housing. In certain embodiments, the geometry of any of the housing, cell stack, membranes, and spacers may selected to accommodate operational parameters of the electrical purification apparatus. For example, the spacers may be asymmetrical to accommodate differences in flow rates between the dilute and concentrate streams.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise an electrical purification apparatus. Accordingly, the foregoing description and drawings are by way of example only. Further, the depictions in the drawings do not limit the disclosures to the particularly illustrated representations.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrical purification apparatus, comprising:
 a plurality of alternating ion depleting compartments and ion concentrating compartments defined by a plurality of ion exchange membranes, each of the plurality of ion depleting compartments and ion concentrating compartments comprising:
  a spacer comprising a body and a cap, the body comprising a plurality of flow compartments, the cap having a thickness of less than about 1 mm and comprising ridges and grooves and a first component that is mated with a second component on the body to provide a seal, the mated cap and body defining a manifold including channels formed from the ridges and grooves of the cap, the ridges and grooves of the cap configured to allow fluid flow through the manifold channels to the plurality of flow compartments, and the spacer constructed and arranged to provide uniform fluid flow through each of the plurality of flow compartments.

2. The electrical purification apparatus of claim 1, wherein the spacer comprises a first side having an uneven surface, and a second side having a flat surface.

3. The electrical purification apparatus of claim 2, further comprising a first modified spacer positioned at a first end of the electrical purification apparatus, the first modified spacer comprising a first side having a flat surface and a second side having a flat surface.

4. The electrical purification apparatus of claim 3, further comprising a first endblock positioned adjacent the first modified spacer, and a second endblock positioned adjacent a second modified spacer positioned at a second end of the electrical purification apparatus, wherein the first endblock and the second endblock have identical geometries.

5. The electrical purification apparatus of claim 1, wherein a thickness of the spacer is in a range of about 2 mm to about 4 mm.

6. The electrical purification apparatus of claim 1, wherein the spacer is constructed and arranged to provide a fluid flow velocity at a first point, a second point, and a third point within about 5 percent to about 10 percent of each other to provide the uniform fluid flow, the first point, the second point, and the third point running parallel to an edge of the spacer.

7. The electrical purification apparatus of claim 1, wherein the spacer is mated to at least one of the plurality of ion exchange membranes via a seal that is molded or over-molded onto the spacer to prevent or reduce leakage of fluid from at least one of the ion depleting compartments and ion concentrating compartments.

8. An electrical purification apparatus, comprising:
 a plurality of alternating ion depleting compartments and ion concentrating compartments defined by a plurality of ion exchange membranes, each of the plurality of ion depleting compartments and ion concentrating compartments comprising:
  a spacer comprising a body and a cap, the body comprising a plurality of flow compartments, the cap having a thickness of less than about 1 mm and comprising ridges and grooves and a first component that is mated with a second component on the body to provide a seal, the cap and the body defining a manifold to provide uniform fluid flow through each of the flow compartments, the manifold comprising channels configured to allow fluid to flow to the plurality of flow compartments, the ridges and grooves configured to provide fluid flow through the channels in the manifold when the cap is mated with the body.

9. The electrical purification apparatus of claim 8, wherein the spacer comprises a first side having an uneven surface, and a second side having a flat surface.

10. The electrical purification apparatus of claim 9, further comprising a first modified spacer positioned at a first end of the electrical purification apparatus, the first modified spacer comprising a first side having a flat surface and a second side having a flat surface.

11. The electrical purification apparatus of claim 10, further comprising a first endblock positioned adjacent the first modified spacer, and a second endblock positioned adjacent a second modified spacer positioned at a second end of the electrical purification apparatus, wherein the first endblock and the second endblock have identical geometries.

12. The electrical purification apparatus of claim 8, wherein the spacer is constructed and arranged to provide a product water resistivity of between about 10 megohm-cm to about 18 megohm-cm over a feed conductivity equivalent of about 5 μS/cm to about 100 μS/cm.

13. The electrical purification apparatus of claim 8, wherein a thickness of the spacer is in a range of about 2 mm to about 4 mm.

14. The electrical purification apparatus of claim 8, wherein the body further comprises ridges and grooves that are configured to align with the ridges and grooves of the cap.

15. The electrical purification apparatus of claim 8, wherein the cap is a first cap and the manifold is a first manifold, and the spacer further comprises a second cap comprising ridges and grooves, the second cap and the body defining a second manifold comprising channels configured to allow fluid to flow from the plurality of flow compartments, the ridges and grooves of the second cap configured to provide for the channels in the second manifold when the second cap is mated with the body.

16. The electrical purification apparatus of claim 15, wherein the body further comprises an inlet in fluid communication with the ridges and grooves of the first cap, and an outlet in fluid communication with the ridges and grooves of the second cap, and wherein the first cap is mated with a portion of the body such that the first manifold is positioned adjacent the inlet, and the second cap is mated with a portion of the body such that the second manifold is positioned adjacent the outlet.

* * * * *